(12) United States Patent
Kinlen et al.

(10) Patent No.: US 11,976,217 B2
(45) Date of Patent: May 7, 2024

(54) CONDUCTIVE ANTI-ICING COATING SYSTEMS AND METHODS

(71) Applicant: THE BOEING COMPANY, Arlington, VA (US)

(72) Inventors: Patrick J. Kinlen, Fenton, MO (US); Dimitris Priftis, Mt. Pleasant, SC (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/345,193

(22) Filed: Jun. 30, 2023

(65) Prior Publication Data

US 2023/0340279 A1    Oct. 26, 2023

Related U.S. Application Data

(63) Continuation of application No. 17/396,242, filed on Aug. 6, 2021, now Pat. No. 11,732,145.

(51) Int. Cl.
| | |
|---|---|
| *B64D 15/12* | (2006.01) |
| *B64C 7/00* | (2006.01) |
| *C09D 5/24* | (2006.01) |
| *C09D 7/20* | (2018.01) |
| *C09D 7/65* | (2018.01) |
| *C09D 129/14* | (2006.01) |
| *C09D 133/04* | (2006.01) |
| *C09D 163/00* | (2006.01) |
| *C09D 167/00* | (2006.01) |

(Continued)

(52) U.S. Cl.
CPC .................. *C09D 5/24* (2013.01); *B64C 7/00* (2013.01); *C09D 7/20* (2018.01); *C09D 7/65* (2018.01); *C09D 129/14* (2013.01); *C09D 133/04* (2013.01); *C09D 163/00* (2013.01); *C09D 167/00* (2013.01); *C09D 171/12* (2013.01); *C09D 175/04* (2013.01); *C09D 181/04* (2013.01); *B64D 15/12* (2013.01)

(58) Field of Classification Search
CPC ....................................................... B64D 15/12
See application file for complete search history.

(56) References Cited

U.S. PATENT DOCUMENTS

| 5,971,323 A | 10/1999 | Rauch et al. |
| 10,464,680 B2 | 11/2019 | Kinlen et al. |

(Continued)

FOREIGN PATENT DOCUMENTS

CN          105032731 A       11/2015

OTHER PUBLICATIONS

Rivero PJ, Rodriguez RJ, Larumbe S, Monteserín M, Martín F, García A, Acosta C, Clemente MJ, García P, Mora J, Agüero A. Evaluation of Functionalized Coatings for the Prevention of Ice Accretion by Using Icing Wind Tunnel Tests. Coatings. 2020; 10(7):636. https://doi.org/10.3390/coatings10070636.

(Continued)

*Primary Examiner* — Long T Tran
(74) *Attorney, Agent, or Firm* — Patterson + Sheridan, LLP

(57) ABSTRACT

The present disclosure provides methods of coating a substrate. A method includes depositing a conductive coating including an electrically conductive material over the substrate to form a conductive layer having a sheet resistivity of about 10Ω/☐ to about 1000Ω/☐. The method includes depositing an anti-icing layer comprising nanomaterials over the conductive layer to form a coating system.

20 Claims, 7 Drawing Sheets

(51) Int. Cl.
*C09D 171/12* (2006.01)
*C09D 175/04* (2006.01)
*C09D 181/04* (2006.01)

(56) References Cited

U.S. PATENT DOCUMENTS

| | | | |
|---|---|---|---|
| 10,541,065 B2 | 1/2020 | Kinlen et al. | |
| 10,607,747 B1 | 3/2020 | Kinlen et al. | |
| 10,685,761 B2 | 6/2020 | Kinlen et al. | |
| 2005/0242233 A1* | 11/2005 | Battisti | F03D 80/40 |
| | | | 244/58 |
| 2008/0099617 A1* | 5/2008 | Gilmore | F03D 80/40 |
| | | | 244/134 R |
| 2008/0251642 A1* | 10/2008 | Boschet | H05B 6/36 |
| | | | 244/134 D |
| 2010/0029465 A1* | 2/2010 | Gentleman | C23C 30/00 |
| | | | 501/152 |
| 2010/0126981 A1* | 5/2010 | Heintz | C08F 291/00 |
| | | | 977/734 |
| 2014/0363291 A1* | 12/2014 | Gaillardon | C09D 5/24 |
| | | | 416/1 |
| 2015/0251767 A1* | 9/2015 | Sapper | B64D 15/00 |
| | | | 244/134 E |
| 2017/0002230 A1* | 1/2017 | Nowak | C08G 18/8083 |
| 2018/0016383 A1 | 1/2018 | Gross et al. | |
| 2018/0027612 A1 | 1/2018 | Roberts et al. | |
| 2018/0057176 A1 | 3/2018 | Kinlen et al. | |
| 2018/0222135 A1* | 8/2018 | Dias Borges Vianna | ..... |
| | | | B29C 70/443 |
| 2019/0169460 A1* | 6/2019 | Loth | B05D 7/56 |
| 2019/0193862 A1* | 6/2019 | Kinlen | B64D 15/20 |
| 2019/0198188 A1 | 6/2019 | Kinlen et al. | |
| 2020/0239146 A1* | 7/2020 | Friend | F02C 7/047 |

OTHER PUBLICATIONS

Wang et al., "Passive Anti-Icing and Active Deicing Films," ACS Appl. Mater. Interfaces 2016, 8, 22, pp. 14169-14173, dated May 18, 2016 [Abstract Only].

Marcio Loos, "Functionalization of CNTs," CNT Composites, pp. 1-2.

European Patent Office, Extended European Search Report for European Patent Application No. 22187919.0-1004, dated Nov. 28, 2022.

* cited by examiner

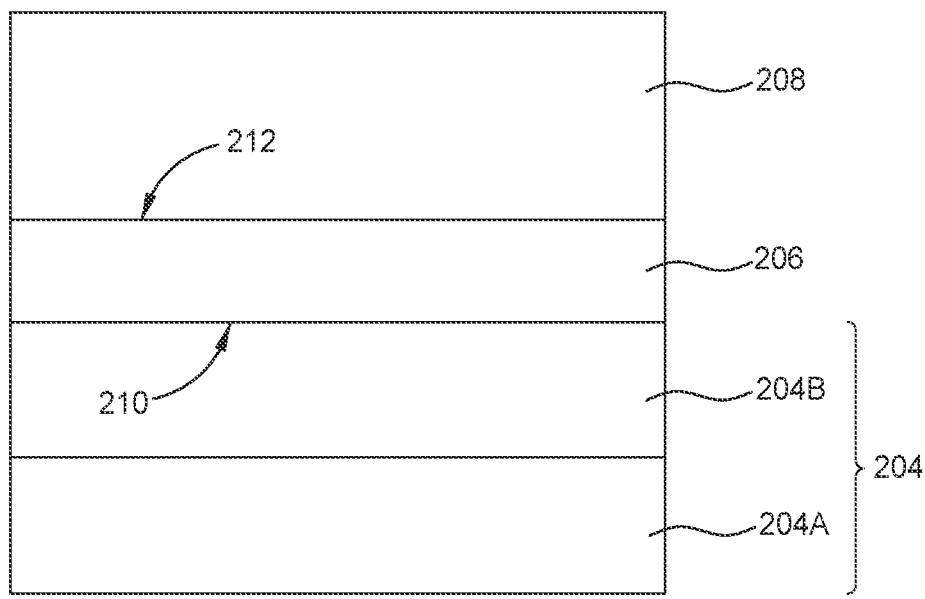

┌─────────────────────────────────┐
│ DEPOSITING A CONDUCTIVE COATING │
│ COMPRISING AN ELECTRICALLY      │──302
│ CONDUCTIVE MATERIAL OVER THE    │
│ SUBSTRATE TO FORM A CONDUCTIVE LAYER │
└─────────────────────────────────┘
                │
                ▼
┌─────────────────────────────────┐
│ DEPOSITING AN ANTI-ICING COATING│
│ COMPRISING NANOMATERIALS OVER THE│──304
│ CONDUCTIVE LAYER TO FORM A COATING│
│ SYSTEM                          │
└─────────────────────────────────┘

FIG. 3

CONDUCTIVE ANTI-ICING COATING SYSTEMS AND METHODS

CROSS-REFERENCE TO RELATED APPLICATIONS

This application is a continuation of U.S. Non-Provisional patent application Ser. No. 17/396,242, filed Aug. 6, 2021, which is incorporated by reference herein in its entirety.

FIELD

Aspects of the present disclosure relate to conductive anti-icing coating systems and methods of making and use thereof.

BACKGROUND

Cold weather conditions promote buildup of ice on vehicle surfaces. To remove the ice, large amounts of chemicals are often sprayed onto the ice to promote melting. Additionally or alternatively, electrical heating of vehicle surfaces to melt the ice involves a large energy consumption to promote sufficient deicing. The large amounts of chemicals and/or energy consumption are each a cost burden on a user of the vehicle.

Deicing is particularly challenging for airfoils, such as rotor blades, of rotorcraft vehicles, such as helicopters. State of the art deicing concepts applied to rotorcraft involve the electrothermal ice protection system. This system remains the only Federal Aviation Administration and Department of Defense approved system for rotor blade implementation.

Although heater designs have been continuously improved, many rotor blade materials cannot be integrated into modern, higher strain designs because they do not possess sufficient mechanical strength.

Another challenge for rotor blade technology is the design of an effective and reliable deicing material that is compatible with edge erosion protection layers (such as titanium, nickel, and polyurethane) disposed on (adjacent to) a surface of a rotor blade. Erosion coatings are typically thermally insulative which necessitates large energy consumption for adequate deicing of a rotor blade surface. Thus, conventional deicing material does not possess adequate electrical properties in addition to durable erosion impact protection for longevity from harsh environments. Conventional surface coating(s) of vehicle components of an aircraft, and rotor blades in particular, are typically not highly conductive, having sheet resistivity of hundreds of kOhms to tens of MegaOhms. Accordingly, conventional surface coatings of an aircraft can allow charge buildup on surfaces (and other components) of the aircraft. In addition to an inability to dissipate charge buildup, conventional coatings could be further improved. For example, performance as to durability parameters such as rain erosion, resistance to UV light, resistance to high temperature, resistance to low temperature, inadequate flexibility, and resistance to sand and hail damage could be further improved for conventional surface coatings on a surface of a vehicle, such as an aircraft, exposed to harsh conditions.

What is needed are materials that are both conductive and provide other improved properties. What is also needed are methods of making and using the materials.

SUMMARY

In some examples, a method of coating a substrate includes depositing a conductive coating comprising an electrically conductive material over the substrate to form a conductive layer having a sheet resistivity of about $10\Omega/\square$ to about $1000\Omega/\square$. The method includes depositing an anti-icing layer comprising nanomaterials over the conductive layer to form a coating system.

In some examples, a coating system is provided having a conductive layer with an electrically conductive material. The conductive layer has a sheet resistivity of about $100\Omega/\square$ to about $1000\Omega/\square$. The coating system includes an anti-icing layer having a nanomaterial, the anti-icing layer disposed over the conductive layer.

In some examples, a coating system is provided having a conductive layer having an electrically conductive material. The conductive layer includes a sheet resistivity of about $100\Omega/\square$ to about $1000\Omega/\square$. The coating system includes an anti-icing layer having a hydrophobic material with a low surface free energy. The anti-icing layer is disposed over the conductive layer.

In some examples, a composite airfoil is provided having a root section with a first surface, an intermediate section with a first surface and coupled with the root section at a first end, a tip section having a first surface and coupled at a first end with a second end of the intermediate section. A coating system is disposed over the first surface of the root section, the first surface of the intermediate section, the first surface of the tip section, or combinations thereof. The coating system includes a conductive layer with an electrically conductive material. The coating system includes an anti-icing layer having nanomaterials disposed over the conductive layer.

BRIEF DESCRIPTION OF THE DRAWINGS

So that the manner in which the above recited features can be understood in detail, a more particular description, briefly summarized above, may be had by reference to example aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

FIG. 2 depicts a side view of an example conductive anti-icing coating system in accordance with some aspects of the present disclosure.

FIG. 3 depicts a flow chart illustrating a method of forming a coating system, in accordance with some aspects of the present disclosure.

Figure 1A:
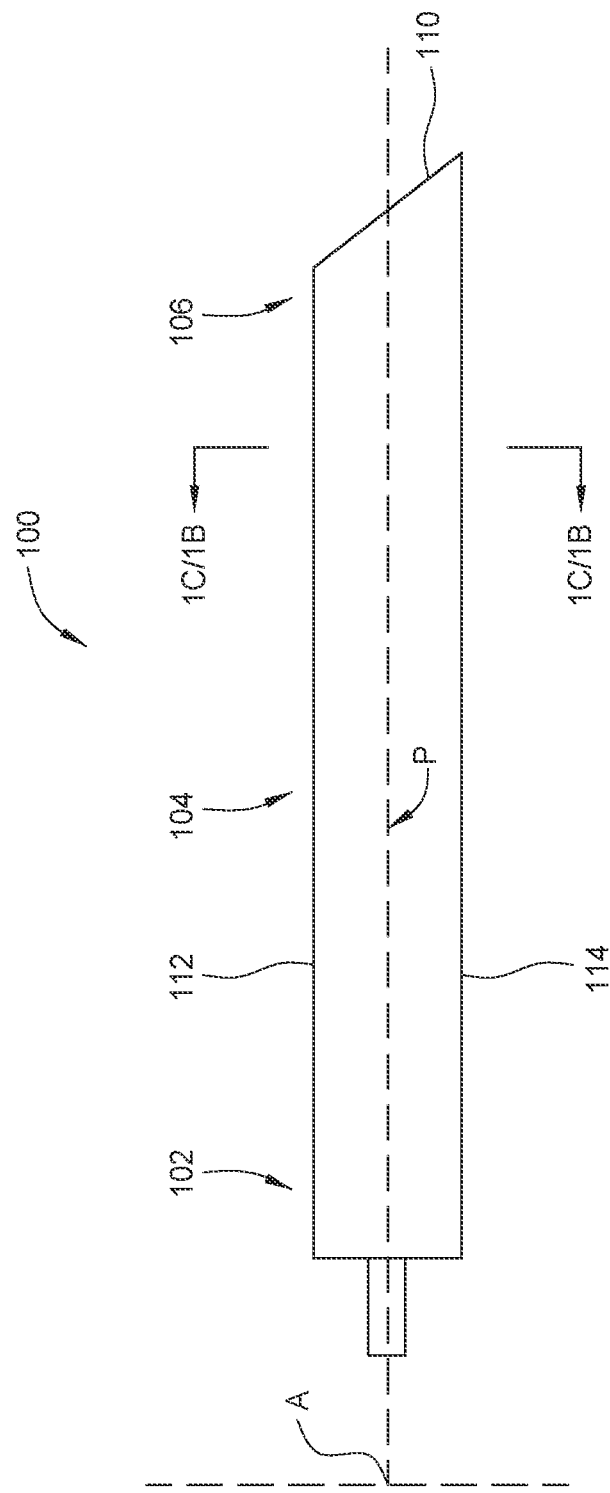
FIG. 1A is a perspective view of a rotor blade, according to some aspects of the present disclosure.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Aspects of the present disclosure generally relate to multi-layer conductive anti-icing coating systems and methods of forming multi-layer conductive anti-icing coating systems. Materials include high conductivity and anti-icing properties. The conductive anti-ice coating system can be used to coat airfoil components. As used herein, "airfoil" includes a substrate in the shape of a wing or a blade (of a propeller, rotor, or turbine). Airfoils comprise rotor blades, static wing surfaces of rotorcraft or fixed wing aircraft. Airfoils, such as rotor blades, comprise one or more surfaces, such as an outer surface, and one or more components (e.g., as described in more detail below). As described herein, "airfoil component" includes any suitable structure adapted, in combination with one or more other airfoil components, to form an airfoil.

Rotor blades of the present disclosure comprise one or more rotor blade components. As described herein, "rotor blade component" comprises any suitable structure adapted, in combination with one or more other rotor blade components, to form a rotor blade. FIG. 1A is a perspective view of a rotor blade, according to some aspects of the present disclosure. As shown in FIG. 1A, rotor blade 100 of a main rotor assembly (not shown) is made of a root section 102, an intermediate section 104, and a tip section 106. Each of sections 102, 104, 106 is any suitable geometry to tailor rotor blade aerodynamics to the velocity increase along the rotor blade span. The sections 102, 104, 106 are substantially the same in length or within 10% of one another by length. Tip section 106 comprises an angled geometry such as anhedral, cathedral, gull, and bent, among others. Rotor blade sections 102, 104, 106 define a span of rotor blade 100 between the axis of rotation A and a distal end 110 of tip section 106 along a longitudinal axis P between a first edge 112 and a second edge 114.

Figure 1B:
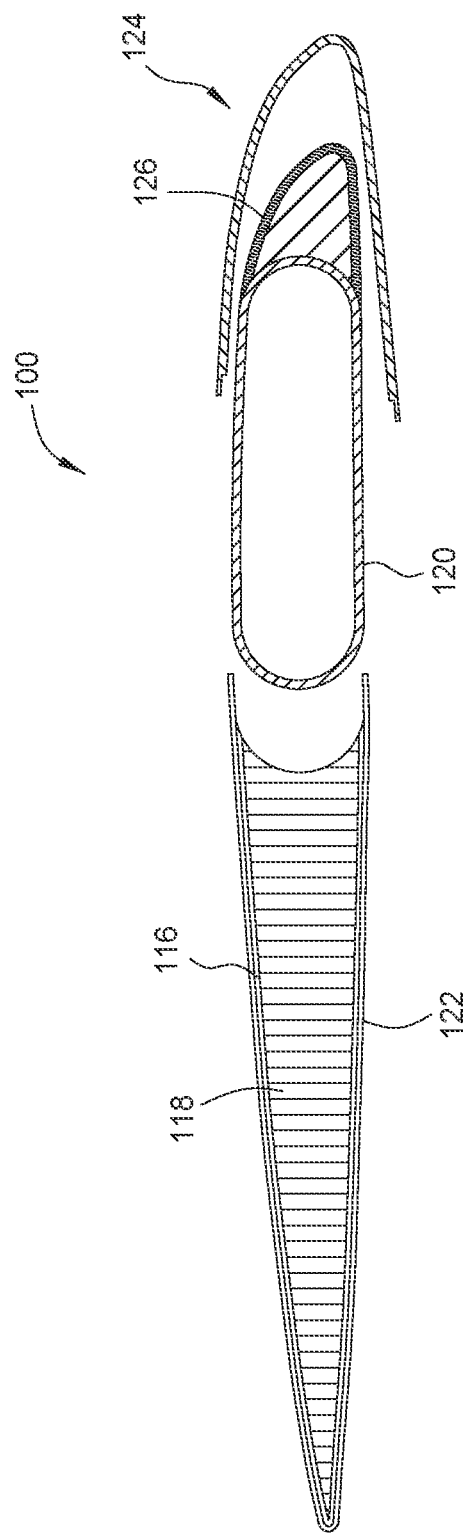
FIG. 1B is a cross-sectional, exploded view of the rotor blade of FIG. 1A, according to some aspects of the present disclosure.

FIG. 1B is a cross-sectional, exploded view of the rotor blade of FIG. 1A. As shown in FIG. 1B, rotor blade 100 is made of an upper skin 116, a core 118, a spar 120 (e.g., main spar), a lower skin 122, and a leading edge assembly 124. Core 118 comprises a lightweight foam material, honeycomb material, or combinations thereof. Skins 116 and 122 comprise one or more plies of prepreg composite material such as woven fiberglass material embedded in any suitable resin matrix material. Resin matrix material comprises an epoxy resin, a polyimide polymer-matrix composite, a bismaleimide high-temperature polymer-matrix composite, an inorganic polymer, a polybenzoxazole, a polybenzoxazine, a polyether ether ketone, or combinations thereof. Alternatively or additionally, a multi-layer conductive anti-icing coating system 150 of the present disclosure can be disposed on (e.g., adjacent) a surface of one or more components of a rotor blade, such as sections 102, 104, and/or 106, skins 116 and 122, core 118, edge assembly 124, counterweight assembly 126 and/or spar 120, as described in more detail below. Spar 120, core 118 and skins 116 and 122 are generally referred to as a pocket assembly, the forward portion of which is capped by leading edge assembly 124. Spar 120 comprises titanium, other metals, composite materials, or combinations thereof. In at least one aspect, spar 120, core 118, skins 116 and 122, and leading edge assembly 124 are separated into a multiple of segments which may include various combinations of spanwise lengths (as opposed to chordwise lengths).

Figure 1C:
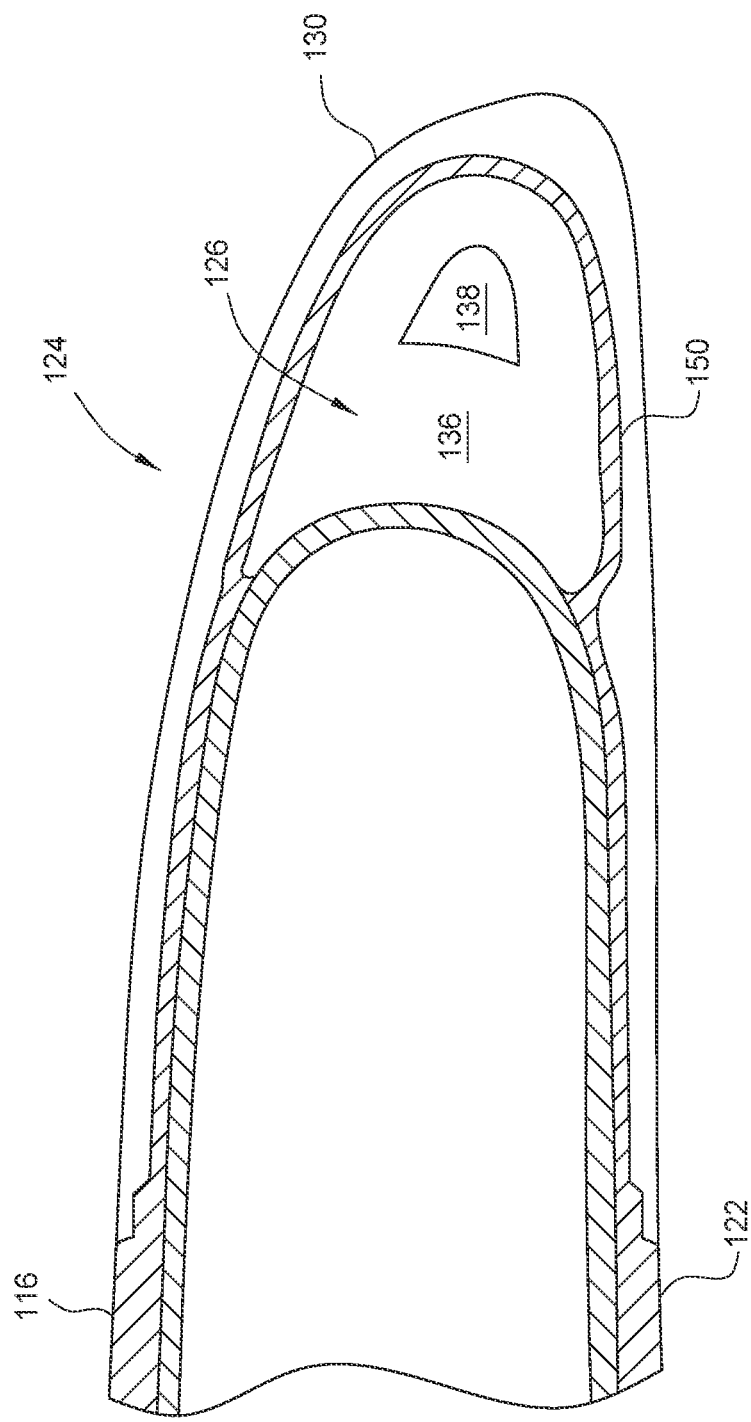
FIG. 1C is an expanded sectional view of a rotor blade, according to some aspects of the present disclosure.
Figure 1D:
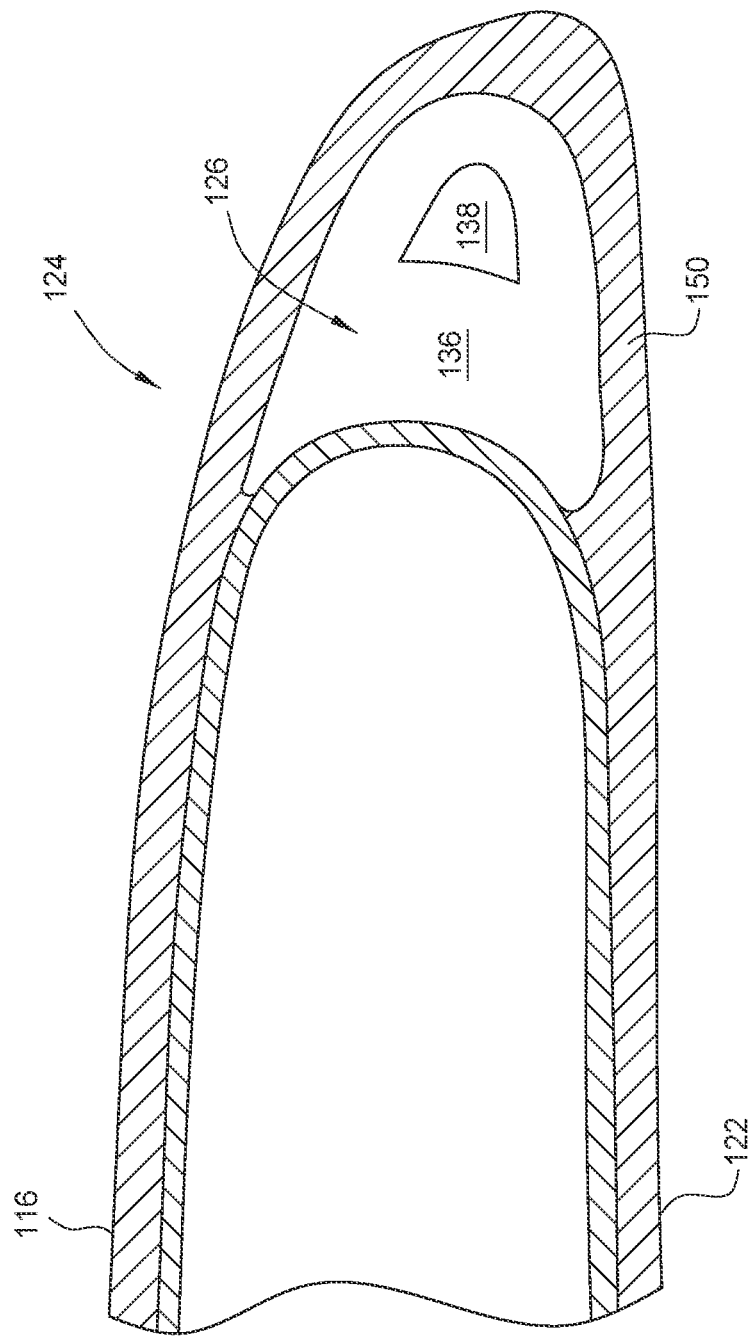
FIG. 1D is an expanded sectional view of a rotor blade, according to some aspects of the present disclosure.
Figure 1E:
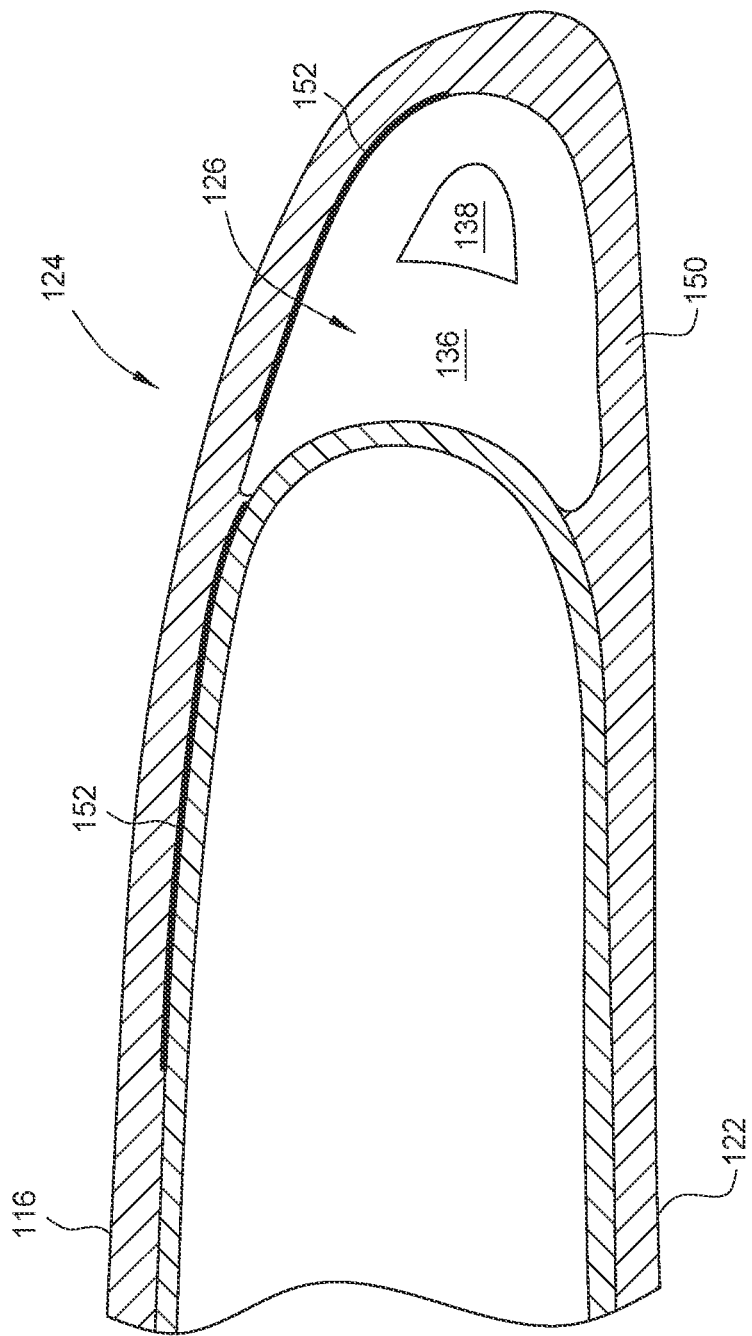
FIG. 1E is an expanded sectional view of a rotor blade, according to some aspects of the present disclosure.

FIGS. 1C, 1D, and 1E are expanded sectional views of the rotor blade of FIG. 1A. As shown in FIG. 1C, an edge assembly 124 can be made of a wear-resistant material layer 130 such as a titanium erosion layer or a nickel erosion layer to provide abrasion protection. Wear-resistant material layer 130 is merely optional and can be disposed on (e.g., adhesively bonded to) a conductive anti-icing coating system 150. As used herein in "wear-resistance" is measured using one or more methods such as one or more of rain erosion based on ASTM G73-10, erosion rate-velocity dependence for materials at supersonic speeds based on STP 474, and abrasion resistance of organic coatings by falling abrasive based on ASTM D968-17. As shown in FIG. 1D, an edge assembly 124 of the present disclosure includes the conductive anti-icing coating system 150 and is free of additional wear-resistant material layer 130. As shown in FIG. 1D, in some aspects, the conductive anti-icing coating system 150 includes wear resistance which reduces or eliminates the need for an additional wear-resistant material layer 130. In some aspects, the conductive anti-icing coating system 150 of FIG. 1C or 1D includes silica, silicon carbide, alumina mica, aluminum flakes, or combination(s) thereof for additional wear resistance. Anti-icing effectiveness is modified by adjusting a loading concentration and particle size. The conductive anti-icing coating system 150 is disposed on (e.g., adhesively bonded to) spar 120 and/or counterweight assembly 126. Edge assembly 124 may comprise any additional suitable wear-resistant material and electrostatically dissipative materials. Adhesive bonding can be polyester adhesives and/or epoxy adhesives. FIG. 1E depicts electrodes 152 that are patterned on the component and each electrode is coupled to a lead through which voltage is applied to heat the electrodes. The electrodes 152 have a length to width ratio (e.g., aspect ratio) of greater than 1. The conductive anti-icing coating system 150 is coated over the one or more electrodes 152. It has been discovered that the conductive anti-icing coating system 150 provides using electrodes 152 having aspect ratios greater than 1, such as 1.5 to 20, such as 2 to 10, such as 5 to 7. An ability to use electrodes having aspect ratios of greater than 1 reduces a weight of the overall component since less leads are needed to heat the electrodes 152.

A counterweight assembly 126 is made of a filler 136 with a weight 138 located therein. Filler 136 comprises one or more plies of prepreg composite material such as woven fiberglass material embedded in a suitable resin matrix material with weight 138 contained therein. Resin matrix material can be an epoxy resin, a polyimide high-temperature polymer-matrix composite, a bismaleimide high-temperature polymer-matrix composite, an inorganic polymer, a polybenzoxazole, a polybenzoxazine, polyetheretherketones, or combinations thereof. Counterweight assembly 126 is adhesively bonded to an edge of spar 120 such that counterweight assembly 126 is disposed between the conductive anti-icing coating system 150 and edge of spar 120. Counterweight assembly 126 provides weight balance of rotor blade 100. In at least one aspect, counterweight assembly 126 is made of weights 138 that are foam, tungsten, lead, or mixtures thereof, in the spanwise direction from root section 102 to tip section 106 so as to provide a weight distribution that weight balances rotor blade 100.

Materials of the present disclosure provide rapid surface heating (e.g., to a temperature of about 100° C., such as about 150° C. or greater) of a rotor blade surface and/or rotor blade component, which provides reduced energy consumption for adequate deicing of one or more components of a rotor blade surface and/or rotor blade component. As used herein, the term "deicing" refers to removing snow, ice or frost from a surface. Rapid surface heating is desirable advantageous because it reduces overall energy demand of heaters of a rotor blade as compared to typical rotor blades. Conventional heaters only melt the interface of the ice, allowing centrifugal force inherent to the rotating blades to remove the ice from the surface. Heat applied too slowly or to thin ice formations does not liberate ice because centrifugal forces are not large enough to overcome the ice/rotor bond. The ice then locally melts and the liquid water flows to the aft portions of the blade and refreezes. This process, called runback, is disadvantageous because the refreeze location is typically outside of the area affected by the heaters and the ice cannot be removed with additional heater pulses. In addition, the refreeze location, near maximum blade thickness, is usually in a region that significantly reduces airfoil performance. The more rapidly the surface is heated, the faster the accumulated ice is melted. The more power applied is based on the thickness of the ice and the temperature of the ice. The higher the power, the faster the existing ice will melt and the better the likelihood of keeping ice from accumulating. The conductive anti-icing coating system 150 described herein has a heating rate that is equal to or faster than the pace of ice accumulation.

In at least one aspect, heaters are not present within a rotor blade of the present disclosure. Furthermore, material of the present disclosure may be disposed on a surface on or above the spar 120 of the rotor blade, unlike the heaters of typical rotor blades. This provides facile repair of components of a rotor blade without involving substantial deconstruction of the rotor blade to repair, for example, a heater.

FIG. 2 depicts a side view of an example conductive anti-icing coating system 150, such as a bi-layer conductive anti-icing coating system. The conductive anti-icing coating system 150 includes a conductive layer 206 disposed over a substrate 204. The substrate 204 can include one or more insulating layers 204B disposed over a surface of a component 204A. The insulating layer 204B can be formed of a resin material. Example resin materials include epoxy, thermoplastic resins, phenolic resins, or silicone resins, which are characterized in being durable and operable under elevated temperatures. In some aspects, the resin material includes a thermostable resin material, such as a thermosetting polymer or a thermoplastic polymer, such as polyurethane. The component 204A can be an airfoil component as described in FIGS. 1A, 1B, and 1C. In some aspects, the component 204A is a rotor. Aluminum foil is embedded in the rotor through a hub and electrically connected to the conductive anti-icing coating system 150 described herein for power. In some aspects, the power requirement for deicing a substrate 204 is about 5 watts/inch$^2$ to about 30 watts/inch$^2$, such as about 5 watts/inch$^2$ to about 15 watts/inch$^2$, or about 10 watts/inch$^2$ to about 20 watts/inch$^2$. In some aspects, each of the component 204A and the insulating layer 204B has a thickness of about 12.7 μm to about 127 μm. The thickness can be any suitable thickness dependent on the component type to provide electrical insulation.

A weight fraction of an electrically conductive material in conductive layer 206, based on a total weight of the conductive layer with the electrically conductive material, is about 0.1 wt % to about 80 wt %, such as about 20 wt % to about 60 wt %, such as about 10 wt % to about 25 wt %. The electrically conductive material can be a polyaniline (PANI), a poly(ethylenedioxythiophene) (PEDOT), or a combination thereof. The electrically conductive material can be doped with one or more sulfonic acids. The electrically conductive material can be PANI or PEDOT doped with one or more of poly(styrenesulfonate) (PSS), dinonylnaphthalene sulfonic acid (DNNSA), dodecylbenzene sulfonic acid (DDBSA). The electrically conductive material provides lightning strike protection, such as static charge dissipation and electromagnetic shielding. The electrically conductive material is selected to provide compatibility with other components of the conductive anti-icing coating system 150. Compatibility includes properties such as solubility, miscibility, and overall ease of processing. Additionally, the electrically conductive material provides high conductivity and stability used for de-icing.

The conductive layer 206 further includes an adhesive material. The adhesive material can be a polyurethane, a polyvinyl butyral, an acrylate, an epoxy, a glycidyl-Si—Zr-containing sol-gel, a thermoplastic such as a polyester, a resin such as a phenoxy resin, a sealant such as a polysulfide, or mixtures thereof. The adhesive material of the conductive layer 206 is selected based on compatibility with the underlying surface (e.g., substrate, electrodes, insulating layer) and compatibility with the anti-icing layer. The conductive layer 206 can include a thermal stabilizer such as a metal oxide, such as zinc oxide. A weight fraction of the thermal stabilizer in the conductive layer 206 based on a total weight of the conductive layer 206, can be about 0.1 wt % to about 10 wt %, such as about 1 wt % to about 2 wt %, or about 3 wt % to about 5 wt %. The conductive layer 206 can be free of thermal stabilizer. The thermal stabilizer provides thermal and ultraviolet (UV) stability. The thermal stabilizer can function as a thermal stabilizer and as a nanomaterial. The thermal stabilizing function can be secondary to the nanomaterial function as described herein.

The conductive layer 206 may be between about 0.1 μm and about 100 μm in thickness, such as about 1 μm to about 8 μm, such as about 2 μm to about 6 μm, or about 15 μm to about 35 μm. The thickness of the conductive layer 206 is determined based on the function of the component, expected ice conditions, expected exposure to wear and tear conditions, and tendency of the component to ice. A conductive layer 206 having a higher thickness is more resilient to wear and tear conditions and enhanced deicing properties. Electrical properties of materials of the present disclosure enable deicing an airfoil, such as a rotor blade surface and/or rotor blade component. Higher conductivity of materials enable reducing thicknesses of material layers compared with using materials having lower conductivity. Reducing thickness reduces weight of the overall components. Thickness controls the electrically resistance of the conductive anti-icing coating system 150. A thicker coating is more conductive and provides higher power. Thin material layers of less than about 1 micron, are advantageous for application of an electrically conductive surface in a confined structure such as a blade spar of a rotor blade. Conventional materials disposed on a spar, for example, are many thousandths of an inch thick, which can hinder bond ability of a material to an erosion protection layer. Bond ability is affected by a substrate being incompatible or having low adhesion with an erosion protection layer. In at least one aspect, materials used in the conductive layer 206 of the present disclosure have a sheet resistivity (e.g. ohm per square (Ω/□) is a unit of sheet resistance) of about 1 to about 10000Ω/□, such as about 10Ω/□ to about 100Ω/□, or about 50Ω/□ to about 150Ω/□, such as about 200Ω/□ to about 500Ω/□, as measured by ASTM D4496-21 for $10^3$ to $10^7$ Ω (per square); ASTM B193-20 for less than $10^3$ Ω (per square).

Conductivity, which is proportional to the inverse of sheet resistivity, provides electrostatic dissipation and deicing. In aerospace applications in need of a durable coating, a thin layer of conductive layer 206 alone may not be sufficiently durable and may use high energy for the conductive coating to operate. It has been discovered that an anti-icing layer 208 can be disposed over a thin conductive layer 206 reducing the amount of energy to the conductive coating to operate. Without the anti-icing layer 208, a given amount of power (e.g., P) is required to keep ice from accumulating. With a perfect anti-icing coating (e.g., a perfectly icephobic coating) with 100% effectiveness, 0 power is required. If the anti-icing coating is 50% effective, the power required would be P/2. The anti-icing layer 208 reduces power demand. The conductive anti-icing coating system 150 is particularly useful in areas in which high amounts of erosion has been observed using conventional coatings, such as the leading edge wing or rotor blade surface. Without being bound by any theory, it is believed that the anti-icing layer 208 serves to inhibit accumulation of ice when super-cooled moisture contacts the surface of the component. The conductive layer 206 is electrically heated to melt any ice that does accumulate. The bilayer conductive anti-icing coating system 150 is more effective and uses less energy than each of the individual layers used alone. The composition and thickness of each layer of the conductive anti-icing coating system 150 is adjustable depending on the component being coated. In the absence of the anti-icing layer 208, such as in conventional coating systems, the conductive layer 206 would use more energy to adequately the melt accumulated ice. Conventional deicing systems deice certain portions of the substrate 204 and ice can accumulate in other portions of the substrate 204. Ice accumulation migration to different portions of surfaces can cause an imbalance. The deicing system described herein is adaptable to temperature variation across the surface because of its hydrophobic properties, and migration of ice accumulation at different portions of substrate surfaces are further mitigated by the heating provided by the conductive layer.

The anti-icing layer 208 includes a base material. In some aspects, the base material is a polymer selected from a polyurethane, a polyvinyl butyral, a polyacrylate, an epoxy, a glycidyl-Si—Zr-containing sol gel, a polyester, a phenoxy resin, a polysulfide, a fluoropolymer, a polysiloxane, or mixtures thereof. In some aspects, the base material is a polymer based on fluoropolymers (e.g. polytetrafluoroethylene, polyvinylidene fluoride) or polysiloxanes (e.g. polydimethylsiloxane). In some aspects, the base material is a sol gel, a silicon-based material, a polyester, or mixtures thereof. In some aspects, the base material is a hydrophobic material, such as a material having a contact angle greater than 90 degrees according to ASTM D7334-08 (2013). The base material may be a fluoropolymer, or a polysiloxane. The anti-icing layer 208 may further include a nanomaterial. The nanomaterial can be silica, alumina, titania, zinc oxide, a fluoropolymer, a silicone, a fluorinated derivative, a polytetrafluoroethylene (PTFE) (e.g., Teflon™), a glycol based component such as for example, mono ethylene glycol, mono propylene glycol, ethylene glycol, propylene glycol, propylene glycol methyl ether, etc. (e.g., anti-freeze), carbon-based nanomaterials, carbon nanotubes, graphene, graphene oxide, reduced graphene oxide, functionalized graphene, or combinations thereof. In some aspects, the nanomaterial can be silica or a metal oxide, such as $Al_2O_3$, $Cr_2O_3$, or $ZrO_2$. In some aspects the nanomaterial is a nanoparticle, a nanorod, a nanofiber, a nanosheet, and combinations thereof. The nanomaterials, such as nanorods, are randomly shaped and have different aspect ratios, such as an aspect ratio greater than about 1.0, such as about 1.5 to about 2.0, or about 2.5 or higher, such as greater than 100 or higher, such as greater than 1000, such as greater than 1,000,000. In some aspects, nanomaterials are incorporated into the base material as a filler or for functionalization to impart roughness to the surface of the anti-icing layer 208. Surface roughness is measured using any method known in the industry such as geometrical product specifications (GPS) based on ISO 3274:1996, surface texture: profile methods, nominal characteristics of contact (stylus) instruments. Surface roughness is also measured using laser profilometers methods. As used herein, the term "aspect ratio" refers to a ratio of a largest length scale to a smallest length scale. The average length scale of the nanomaterials can be about 10 nm to about 500 nm, such as about 100 nm to about 200 nm, or about 250 nm to about 350 nm, as measured under microscopy such as atomic force microscopy (AFM), transmission electron microscopy (TEM), or scanning electron microscopy (SEM). In some aspects, the nanomaterial are carbon nanotubes from 10 nm to 10 cm, such as about 1000 nm to about 3 cm.

The base material of the anti-icing layer 208 includes the same material(s) as the adhesive material of the conductive layer 206. Including the same material(s) in the conductive layer 206 and the anti-icing layer 208 provides good interfacial adhesion at the coating interface 212 between the anti-icing layer 208 and the conductive layer 206. Enhanced interfacial adhesion is possible because the same material in both layers bond to one another. In some aspects, the nanomaterial in the anti-icing layer 208 is composed of the same material(s) as the thermal stabilizer in the conductive layer 206. In some aspects, the conductive layer 206 and the anti-icing layer 208 each include polyurethane and ZnO in both layers which provides good interfacial adhesion and less thermal expansion/contraction of the coating system (e.g., improved material compatibility). The anti-icing layer 208 provides good electrical insulation, such as zero surface sheet resistivity. The anti-icing layer 208 can include low surface energy additives or hygroscopic additives. The anti-icing layer 208 meets rain erosion requirements for conventional aerospace stack ups. Rain erosion requirements is measured by whirling arm rain erosion based on ASTM G73-10. In some aspects, the nanomaterial includes nanoparticles that are surface-modified with a hydrophobic material selected from a group consisting of alkylsilanes, alkyldisilazanes, fluoropolymers, and combinations thereof. The anti-icing layer 208 is hydrophobic (repels liquids), anti-icing (prevents freezing), and is durable. As used herein, durability is indicative of lasting at least one rotorcraft mission or multiple commercial flights. The nanomaterial disposed within the anti-icing layer 208 inhibits nucleation of ice formed on the surface of the conductive anti-icing coating system 150. In particular, the surface is capable of repelling water and ice accumulation is reduced and/or delayed at below freezing temperatures and pressures. A weight fraction of base material in the anti-icing layer 208 may be about 5 wt % to about 90 wt %, such as about 10 wt % to about 40 wt %, based on a total weight of the anti-icing layer 208. It has been discovered that the conductive layer 206 and the anti-icing layer 208 together form a conductive anti-icing coating system 150 that provides improved durability and ice-phobic properties with reduced film thickness relative to coatings consisting of the conductive layer 206 or consisting of the anti-icing layer 208. The combination of conductive layer 206 and anti-icing layer 208 enables thinner coating systems, and/or a lower power requirement due to the presence of the anti-icing layer 208. A weight fraction of nanomaterials in the anti-icing layer 208 is about 0.5 wt % to about 25 wt %, such as about 10 wt % to about 20 wt %, or about 5 wt % to about 10 wt %. In some aspects, the anti-icing layer 208 may be about 0.1 μm and to about 1500 μm in thickness, such as about 100 μm to about 1020 μm, such as about 200 μm to about 600 μm, or about 300 μm to about 500 μm. In some aspects, the anti-icing layer 208 is the same thickness as the conductive layer, or within about 10% of the thickness of the conductive layer. In some aspects, a ratio of conductive layer thickness to anti-icing layer thickness is about 1:1 to about 1:100, such as about 1:10 to about 1:40. In some aspects, the anti-icing layer 208 adds additional durability for applications of thin conductive layers, such as about 0.1 μm to about 1 μm. The anti-icing layer thickness is increased relative to the conductive layer depending on durability requirements. A conductive layer 206 alone would not be durable enough for aerospace applications. The addition of an anti-icing layer 208 provides overall durability to the system and reduces the energy required for the conductive coating to operate. Conventional conductive coatings use increased thicknesses to handle durable applications, further increasing of conventional conductive coatings to achieve similar anti-icing properties would be too heavy for airworthiness.

Epoxies include partially cured epoxies, a particular addition of epoxies, two-component epoxy resin that includes a catalyst (such as HYSOL® EA 956 epoxy resin available from Henkel Corporation of Bay Point, California), a two liquid system that includes both a resin and a hardener (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also include a difunctional epoxy, such a Bisphenol-A (Bis-A) or Bisphenol-F (Bis-F)-based epoxies. Bis-A epoxy resin is available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft because they are durable, e.g. aft of a leading edge surface or beneath a surface of erosion protective materials of a rotor blade.

Polyanilines comprise, for example, a polyaniline of Formula (I):

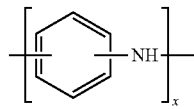

(where x is a positive integer, such as between about 10 and about 10,000), leucoemeraldine, emeraldine, and (per)nigraniline, mixtures thereof, salts thereof, or bases thereof. Polyanilines are unsubstituted, monosubstituted, or multiply substituted (e.g., disubstituted, tri substituted, or tetra-substituted) where each instance of substitution is independently alkyl (e.g., C1-C20 alkyl), aryl, amino, nitro, or halo (—F, —Cl, —Br, —I).

Poly(ethylenedioxythiophene)s comprise, for example, a poly(ethylenedioxythiophene) of the Formula (II):

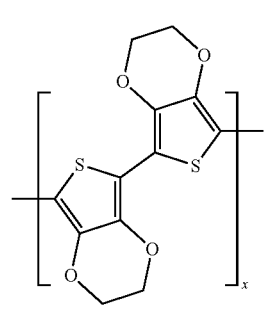

(where x is a positive integer, such as between about 10 and about 10,000) and/or salts thereof. Poly(ethylenedioxythiophene)s are unsubstituted, monosubstituted, or multiplysubstituted (e.g., disubstituted, trisubstituted, or tetrasubstituted) where each instance of substitution is independently selected from alkyl (e.g., C1-C20 alkyl), aryl, amino, nitro, and halo (—F, —Cl, —Br, —I).

Poly(styrenesulfonate)s comprise, for example, a poly(styrenesulfonate) of the Formula (III):

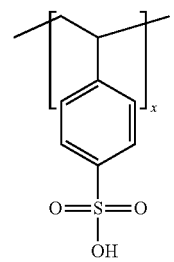

(where x is a positive integer, such as between about 10 and about 10,000) and/or salts thereof. Poly(styrenesulfonate)s are unsubstituted, monosubstituted, or multiplysubstituted (e.g., disubstituted, trisubstituted, or tetrasubstituted) where each instance of substitution is independently selected from alkyl (e.g., C1-C20 alkyl), aryl, amino, nitro, and halo (—F, —Cl, —Br, —I).

Acrylates comprise, for example, a polyacrylate of Formula (IV):

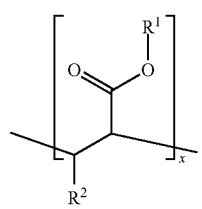

(where x is a positive integer, such as between about 10 and about 10,000) and/or salts thereof. $R^1$ and $R^2$ is independently C1-C20 alkyl or C1-C20 hydroxyalkyl. In at least one aspect, $R^2$ is methyl. Acrylates include hydroxyalkyl polyacrylates, hydroxyalkyl polymethacrylates, alkyl polyacrylates, and alkyl polymethacrylates. Examples of suitable hydroxyalkyl polyacrylates, or hydroxyalkyl polymethacrylates comprise poly(2-hydroxyethyl acrylate), poly(2-hydroxy-1-methylethyl acrylate), poly(2-hydroxypropyl acrylate), poly(3-hydroxypropyl acrylate), poly(2-hydroxybutyl acrylate), poly(4-hydroxybutyl acrylate), poly(2-hydroxyethyl methacrylate), poly(2-hydroxy-1-methylethyl methacrylate), poly(2-hydroxypropyl methacrylate), poly(3-hydroxypropyl acrylate), poly(2-hydroxybutyl methacrylate), poly(4-hydroxybutyl methacrylate) and the like, and acrylic acid or methacrylic acid esters of ethylene glycol and propylene glycol such as poly(diethylene glycol acrylate), and the like. Also useful are hydroxy-containing esters and/or amides of unsaturated acids such as maleic acid, fumaric acid, itaconic acid, and the like. In at least one example, a hydroxy-acrylic polymer is made of from 5 percent to 35 percent by weight of monoethylenically unsaturated hydroxy-containing monomers based on total acrylate weight, and in certain examples from 10 percent to 25 percent by weight. Suitable alkyl polyacrylates and polymethacrylates comprise poly(methyl acrylate), poly(ethyl acrylate), poly(propyl acrylate), poly(isopropyl acrylate), poly(butyl acrylate), poly(isobutyl acrylate), poly(hexyl acrylate), poly(2-ethylhexyl acrylate), poly(nonyl acrylate), poly(lauryl acrylate), poly(stearyl acrylate), poly(cyclohexyl acrylate), poly(isodecyl acrylate), poly(phenyl acrylate), poly(isobornyl acrylate), poly(methyl methacrylate), poly(ethyl methacrylate), poly(propyl methacrylate), poly(isopropyl methacrylate), poly(butyl methacrylate), poly(isobutyl methacrylate), poly(hexyl methacrylate), poly(2-ethylhexyl methacrylate), poly(nonyl methacrylate), poly(lauryl methacrylate), poly(stearyl methacrylate), poly(cyclohexyl methacrylate), poly(isodecyl methacrylate), poly(phenyl methacrylate), poly(isobornyl methacrylate), and the like.

Polyurethanes comprise, for example, a polyurethane of Formula (V):

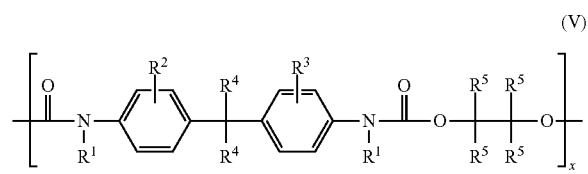

(where x is an integer between about 10 and about 10,000). Each instance of $R^1$, $R^2$, $R^3$, $R^4$, and $R^5$ is independently hydrogen or C1-C20 alkyl. Polyurethanes comprise Aptek 2100 AB and Aerodur 3002 (available from Argosy International, Inc.). Polyurethanes are unsubstituted, monosubstituted, or multi ply substituted (e.g., disubstituted, tri substituted, or tetra substituted) where each instance of substitution is independently alkyl (e.g., C1-C20 alkyl), aryl, amino, nitro, or halo (—F, —Cl, —Br, —I).

FIG. 3 depicts a flow chart illustrating a method of forming a conductive anti-icing coating system 150. The method 300 includes depositing 302 a conductive coating over a substrate to form a conductive layer 206. The substrate may be a component of an airfoil, such as a rotor blade surface and/or rotor blade component. In some aspects the substrate is a radome, engine inlet, airfoil, other component affected by ice accumulation such as a fixed wing, or a wind turbine. The substrate 204 can include one or more insulating layers 204B disposed over a surface of a component 204A. The insulating layer 204B may be deposited on the component 204A in a variety of ways such as brushing, painting, patterning, printing, any additive manufacturing method, or any combination(s) thereof. Each of the layers are deposited based on thickness control requirements. In particular, for thinner systems, a spray application increases deposition thickness by 0.4 mils to about 2 mils per pass, a brush application increases deposition thicknesses by about 2-3 mils per pass. The insulating layer 204B may be cured by heat or chemical additives, among other processes. Curing can be partial or may be full depending on the application and implementation. The surface 210 of the insulating layer 204B is configured to receive a conductive layer 206, such as conductive layers 206 described herein.

Depositing the conductive layer 206 can include dissolving the electrically conductive material and/or the adhesive material of the conductive coating in a solvent before depositing. The solvent may be a xylene, benzene, toluene, dimethyl sulfoxide, water, and mixtures thereof. Depositing can include flow-coating, drop-casting, dip-coating, spray-coating, screen printing, slot-die coating, flow coating, in-molding, co-curing, and/or ink-jet printing. The method may further include depositing a thermal stabilizer such as zinc oxide over one or both of the electrically conductive material and the adhesive material. Alternatively, the thermal stabilizer may be suspended within one or both of the electrically conductive material and the adhesive material (e.g., with the solvent). The conductive layer 206 can be at least partially or fully cured. The conductive layer can be at least partially cured at a temperature of about 10° C. to about 200° C., such as about 10° C. to about 40° C., a pressure of about 3 torr to about 760 torr, such as about 500 torr to about 760 torr, and at a relative humidity of less than about 50% relative humidity, such as about 20% relatively humidity to about 40% relative humidity, or about 60% relative humidity to about 90%. In some aspects, an interfacial layer is disposed between the conductive layer 206 and the anti-icing layer 208 or the conductive layer 206 is in direct contact with the anti-icing layer 208.

The method 300 further includes depositing 304 an anti-icing layer 208 over the at least partially cured conductive layer 206 to form a conductive anti-icing coating system 150. The anti-icing layer 208 can be formed by dispersing nanomaterials within a polymer. The nanomaterials can be chemically and/or physically bonded to the polymer layer. A weight percent of nanomaterial can be about 5 wt % to about 25 wt % based on weight of the anti-icing layer 208, wherein the anti-icing layer 208 is substantially free of the electrically conductive material. Depositing the anti-icing layer 208 can use a process of flow-coating, drop-casting, dip-coating, spray-coating, brush-coating, spin coating, roll coating, co-curing, electrocoating, screen printing, slot-die coating, flow coating, in-molding, co-curing, ink-jet printing, or combination(s) thereof. The anti-icing layer 208 can be at least partially cured at a temperature of about 10° C. to about 200° C., such as about 10° C. to about 40° C., a pressure of about 3 torr to about 760 torr, such as about 500 torr to about 760 torr, and at a relative humidity of less than about 50% relative humidity, such as about 20% relatively humidity to about 40% relative humidity, or about 60% relative humidity to about 90%.

Example

Figure 4:
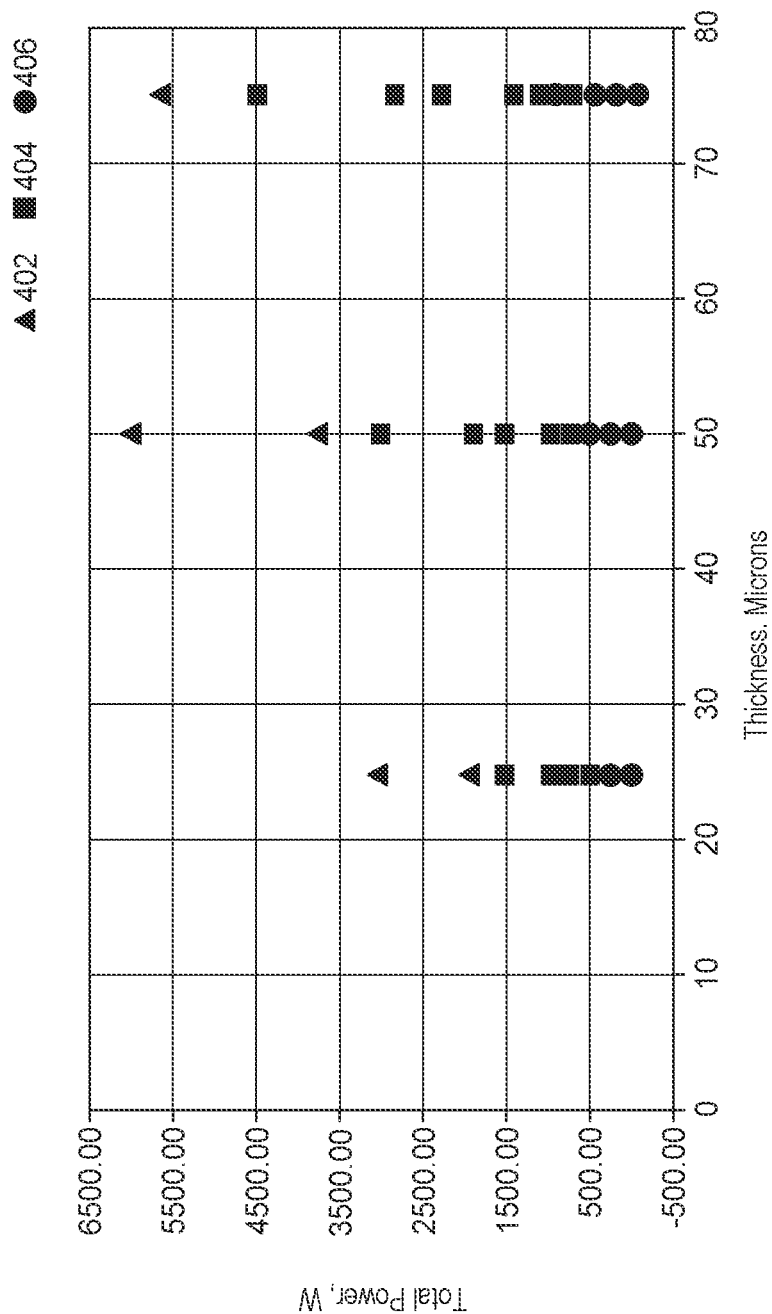
FIG. 4 depicts a comparative graphical representation of the total power needed for various coatings, according to some aspects of the present disclosure.

Data was generated (e.g., simulated) for examples of coating systems to compare attributes of the coating systems such as sheet resistivity, power density, and total power as a function of variables such as coating thickness, conductivity of the conductive layer, and aspect ratio of an underlying electrode. The data for a voltage of 150 V applied to an electrode having a width of 12.7 cm is summarized in Table 1 and the data for a voltage of 190 V applied to the electrode having a width of 12.7 cm is summarized in Table 2. A length of each electrode is determined based on the summarized aspect ratios. For both tables, a conductive layer with a composition having a conductivity of 2 S/cm was used to simulate total power needed at different coating thicknesses (25 µm, 50 µm, and 75 µm), electrode aspect ratio, and percentage of the total coating system thickness that is an anti-icing layer 208 relative to a coating system thickness of the anti-icing layer 208 together with the conductive layer 206. In particular, FIG. 4 is provided to compare the total power needed for a coating without an anti-icing layer curve 402, a coating system with a thickness that is 50% anti-icing layer curve 404 (e.g., also expressed as 50% anti-icing efficiency), and a coating system with a thickness that is 90% anti-icing layer curve 406, (e.g., also expressed as 90% anti-icing efficiency). As can be seen, the power needed for curve 406 is reduced, which enables down gaging of the underlying conductive layer for the same deicing ability. Total coating thickness, aspect ratio of electrode, and anti-icing layer thickness are each adjustable based on the application of the coating system and deicing requirements. Deicing needs can be categorized as icing intensities ranging from light, moderate, heavy, or severe. A light icing intensity can correspond to an accretion rate of 0.6 cm/hr to 2.5 cm/hour, moderate icing intensity can correspond to an accretion rate of 2.5 cm/hr to 7.5 cm/hr, heavy icing intensity can correspond to an accretion of 7.5 cm/hr or greater, and severe icing intensity can correspond to icing conditions that are typically not manageable by conventional deicing systems. Icing intensities can be measured by a suitable icing rate meter. A 0.6 cm/hr accretion rate requires a power density of about 3 $W/cm^2$ to melt the ice. Thus, a power density target is used to design a coating system and electrode arrangement specifically for the desired application and icing intensity. A power density is a total power over an area of an electrode. For example, a power density of 0.08 $W/cm^2$ shown below can be calculated by obtaining a product of the current (e.g., 0.78 A) and voltage (150 V), divided by the area of the electrode. The sheet resistivity is an inverse of the product of the conductivity (2 S/cm) and the thickness of the coating system.

TABLE 1

Voltage of 150 V

| Thickness, µm | Sheet resistivity Ω/□ | Aspect ratio | Ohms | Current, A | $W/cm^2$ | Total Power, W No AI | Total Power W 50% AI | Total Power W 90% AI |
|---|---|---|---|---|---|---|---|---|
| 25 | 20.00 | 9.60 | 192.00 | 0.78 | 0.08 | 117.19 | 58.59 | 11.72 |
| 50 | 10.00 | 9.60 | 96.00 | 1.56 | 0.15 | 234.38 | 117.19 | 23.44 |
| 75 | 6.67 | 9.60 | 64.00 | 2.34 | 0.23 | 351.56 | 175.78 | 35.16 |
| 25 | 20.00 | 4.80 | 96.00 | 1.56 | 0.30 | 234.38 | 117.19 | 23.44 |
| 50 | 10.00 | 4.80 | 48.00 | 3.13 | 0.61 | 468.75 | 234.38 | 46.88 |
| 75 | 6.67 | 4.80 | 32.00 | 4.69 | 0.91 | 703.13 | 351.56 | 70.31 |
| 25 | 20.00 | 2.40 | 48.00 | 3.13 | 1.21 | 468.75 | 234.38 | 46.88 |
| 50 | 10.00 | 2.40 | 24.00 | 6.25 | 2.42 | 937.50 | 468.75 | 93.75 |
| 75 | 6.67 | 2.40 | 16.00 | 9.38 | 3.63 | 1406.25 | 703.13 | 140.63 |
| 25 | 20.00 | 1.20 | 24.00 | 6.25 | 4.84 | 937.50 | 468.75 | 93.75 |
| 50 | 10.00 | 1.20 | 12.00 | 12.50 | 9.69 | 1875.00 | 937.50 | 187.50 |
| 75 | 6.67 | 1.20 | 8.00 | 18.75 | 14.53 | 2812.50 | 1406.25 | 281.25 |
| 25 | 20.00 | 0.60 | 12.02 | 12.48 | 19.32 | 1872.54 | 936.27 | 187.25 |
| 50 | 10.00 | 0.60 | 6.01 | 24.97 | 38.65 | 3745.09 | 1872.54 | 374.51 |
| 75 | 6.67 | 0.60 | 4.01 | 37.45 | 57.97 | 5617.63 | 2808.81 | 561.76 |

TABLE 2

Voltage of 190 V

| Thickness, µm | Sheet resistivity Ω/□ | Aspect ratio | Ohms | Current, A | $W/cm^2$ | Total Power, W No AI | Total Power W 50% AI | Total Power W 90% AI |
|---|---|---|---|---|---|---|---|---|
| 25 | 20.00 | 9.60 | 192.00 | 0.99 | 0.12 | 188.02 | 94.01 | 18.80 |
| 50 | 10.00 | 9.60 | 96.00 | 1.98 | 0.24 | 376.04 | 188.02 | 37.60 |
| 75 | 6.67 | 9.60 | 64.00 | 2.97 | 0.36 | 564.06 | 282.03 | 56.41 |
| 25 | 20.00 | 4.80 | 96.00 | 1.98 | 0.490 | 376.04 | 188.02 | 37.60 |
| 50 | 10.00 | 4.80 | 48.00 | 3.96 | 0.97 | 752.08 | 376.04 | 75.21 |
| 75 | 6.67 | 4.80 | 32.00 | 5.94 | 1.46 | 1128.13 | 564.06 | 112.81 |
| 25 | 20.00 | 2.40 | 48.00 | 3.96 | 1.94 | 752.08 | 376.04 | 75.21 |
| 50 | 10.00 | 2.40 | 24.00 | 7.92 | 3.89 | 1504.17 | 752.08 | 150.42 |
| 75 | 6.67 | 2.40 | 16.00 | 11.88 | 5.83 | 2256.25 | 1128.13 | 225.63 |
| 25 | 20.00 | 1.20 | 24.00 | 7.92 | 7.77 | 1504.17 | 752.08 | 150.42 |
| 50 | 10.00 | 1.20 | 12.00 | 15.83 | 15.54 | 3008.33 | 1504.17 | 300.83 |
| 75 | 6.67 | 1.201 | 8.00 | 23.75 | 23.31 | 4512.50 | 2256.25 | 451.25 |
| 25 | 20.00 | 0.60 | 12.02 | 15.81 | 31.00 | 3004.39 | 1502.20 | 300.44 |
| 50 | 10.00 | 0.60 | 6.01 | 31.63 | 62.01 | 6008.78 | 3004.39 | 600.88 |
| 75 | 6.06 | 0.67 | 4.06 | 46.84 | 82.44 | 8899.71 | 4449.86 | 889.97 |

Additional Aspects

Clause 1. A method of coating a substrate, comprising: depositing a conductive layer comprising an electrically conductive material over the substrate, the conductive layer having a sheet resistivity of about 10Ω/□ to about 1000Ω/□; and depositing an anti-icing layer comprising nanomaterials over the conductive layer to form a conductive anti-icing coating system.

Clause 2. The method of Clause 1, further comprising at least partially curing the conductive layer before depositing the anti-icing layer over the conductive layer.

Clause 3. The method of Clause 2, wherein at least partially curing the conductive layer comprises at least partially curing the conductive layer at about 10° C. to about 40° C., about 500 torr to about 760 torr, and at a relative humidity of less than about 50% relative humidity.

Clause 4. The method of any of Clauses 1 to 3, wherein the electrically conductive material is selected from a group consisting of a polyaniline, a poly(ethylenedioxythiophene), a poly(styrenesulfonate), and mixtures thereof.

Clause 5. The method of any of Clauses 1 to 4, further comprising combining the electrically conductive material with an adhesive material selected from a group consisting of a polyurethane, a polyvinyl butyral, a polyacrylate, an epoxy, a glycidyl-Si—Zr-containing sol gel, a polyester, a phenoxy resin, a polysulfide, and mixtures thereof.

Clause 6. The method of any of Clauses 1 to 5, wherein combining the electrically conductive material with the adhesive material comprises dissolving the electrically conductive material in a solvent before combining the adhesive material with the electrically conductive material.

Clause 7. The method of any of Clauses 1 to 6, wherein the anti-icing layer comprises a polymer selected from a group consisting of a polyurethane, a polyvinyl butyral, a polyacrylate, an epoxy, a glycidyl-Si—Zr-containing sol gel, a polyester, a phenoxy resin, a polysulfide, and mixtures thereof.

Clause 8. The method of any of Clauses 1 to 7, wherein the conductive layer further comprises an adhesive material selected from a group consisting of a polyurethane, a polyvinyl butyral, a polyacrylate, an epoxy, a glycidyl-Si—Zr-containing sol gel, a polyester, a phenoxy resin, a polysulfide, and mixtures thereof, wherein the polymer and the adhesive material are the same.

Clause 9. The method of any of Clauses 1 to 8, wherein the anti-icing layer comprises the nanomaterials in an amount of about 5 wt % to about 25 wt % based on weight of the anti-icing layer, wherein the anti-icing layer is substantially free of the electrically conductive material.

Clause 10. The method of any of Clauses 1 to 9, further comprising combining a thermal stabilizer with the conductive material, wherein the conductive layer comprises the thermal stabilizer in an amount of less than 5 wt % based on weight of the conductive layer.

Clause 11. The method of any of Clauses 1 to 10, wherein coating the substrate comprises coating one or more electrodes disposed over the substrate.

Clause 12. The method of any of Clauses 1 to 11, wherein the anti-icing layer is deposited by flow-coating, drop-casting, dipping, spraying, brush coating, spin coating, roll coating, in-mold coating, co-curing, or electrocoating.

Clause 13. The method of any of Clauses 1 to 12, further comprising curing the anti-icing layer at about 10° C. to about 40° C., about 500 torr to about 760 torr, and a relative humidity of less than about 50% relative humidity.

Clause 14. The method of any of Clauses 1 to 3, further comprising dissolving the conductive material in a solvent selected from a group consisting of xylene, benzene, toluene, dimethyl sulfoxide, water, and mixtures thereof.

Clause 15. The method of any of Clauses 1 to 14, wherein the conductive layer is deposited by flow-coating, drop-casting, dipping, spraying, brush coating, spin coating, roll coating, in-mold coating, co-curing, or electrocoating.

Clause 16. A coating system, comprising: conductive layer comprising an electrically conductive material, the conductive layer comprising a sheet resistivity of about 100Ω/□ to about 1000Ω/□; and an anti-icing layer comprising a nanomaterial, the anti-icing layer disposed over the conductive layer.

Clause 17. The coating system of Clause 16, wherein the electrically conductive material is selected from a group consisting of a polyaniline, a poly(ethylenedioxythiophene), a poly(styrenesulfonate), and mixtures thereof.

Clause 18. The coating system of Clauses 16 or 17, wherein the conductive layer comprises an adhesive material selected from a group consisting of a polyurethane, a polyvinyl butyral, a polyacrylate, an epoxy, a glycidyl-Si—Zr-containing sol gel, a polyester, a phenoxy resin, a polysulfide, and mixtures thereof.

Clause 19. The coating system of any of Clauses 16 to 18, wherein the nanomaterial is selected from a group consisting of silica, alumina, titania, zinc oxide, fluoropolymer, silicone, carbon nanotubes, graphene, graphene oxide, reduced graphene oxide, functionalized graphene, and combinations thereof.

Clause 20. The coating system of any of Clauses 16 to 19, wherein the nanomaterial is surface modified with a hydrophobic material selected from a group consisting of alkylsilanes, alkyldisilazanes, fluoropolymers, and combinations thereof.

Clause 21. The coating system of any of Clauses 16 to 20, wherein the nanomaterial is selected from a group consisting of a nanoparticle, a nanorod, a nanofiber, a nanosheet, and combinations thereof.

Clause 22. The coating system of any of Clauses 1 to 21, wherein the conductive layer comprises a thermal stabilizer.

Clause 23. The coating system of Clause 22, wherein the thermal stabilizer comprises zinc oxide.

Clause 24. The coating system of Clause 22, wherein the conductive layer has a thickness of about 15 μm to about 35 μm.

Clause 25. The coating system of any of Clauses 1 to 24, further comprising an insulating layer underlying the conductive layer.

Clause 26. The coating system of any of Clauses 1 to 25, wherein the anti-icing layer comprises a polymer selected from the group consisting of a sol gel, polysiloxane, polyester, fluoropolymer, a polysiloxane and combination thereof.

Clause 27. The coating system of any of Clauses 1 to 26, wherein the anti-icing layer further comprises low surface energy additives or hygroscopic additives.

Clause 28. The coating system of any of Clauses 1 to 27, wherein the anti-icing layer comprises a polytetrafluoroethylene (PTFE) and/or a glycol based component.

Clause 29. A coating system, comprising: a conductive layer comprising an electrically conductive material, the conductive layer comprising a sheet resistivity of about 100Ω/□ to about 1000Ω/□; and an anti-icing layer comprising a material having a contact angle greater than 90 degrees according to ASTM D7334, the anti-icing layer disposed over the conductive layer.

Clause 30. A composite airfoil, comprising: a root section comprising a first surface; an intermediate section comprising a first surface and coupled with the root section at a first end; a tip section comprising a first surface and coupled at a first end with a second end of the intermediate section; a coating system disposed over the first surface of the root section, the first surface of the intermediate section, the first surface of the tip section, or combinations thereof, the coating system comprising: a conductive layer comprising an electrically conductive material; and an anti-icing layer disposed over the conductive layer.

Clause 31. The composite airfoil of Clause 30, wherein the coating system is disposed over the first surface of the root section, wherein the conductive layer has a thickness of about 0.1 μm to about 100 μm and the anti-icing layer has a thickness of about 500 μm to about 1000 μm.

Clause 32. The composite airfoil of Clauses 30 or 31, wherein the anti-icing layer comprises nanorods.

Clause 33. The composite airfoil of any of Clauses 30 to 32, wherein the anti-icing layer comprises nanorods in an amount of about 0.5 wt % to about 10 wt % based on weight of the anti-icing layer.

Clause 34. The composite airfoil of any of Clauses 30 to 33, wherein the conductive layer comprises the electrically conductive material in an amount of about 10 wt % to about 25 wt % based on weight of the conductive layer.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A coating system, comprising:
    a conductive layer comprising an electrically conductive material, the conductive layer comprising a sheet resistivity of about 100Ω/□ to about 1000Ω/□; and
    an anti-icing layer comprising a nanomaterial having a contact angle greater than 90 degrees according to ASTM D7334, the anti-icing layer disposed over the conductive layer, wherein the anti-icing layer is substantially free of the electrically conductive material.

2. The coating system of claim 1, wherein the nanomaterial is surface modified with a hydrophobic material.

3. The coating system of claim 2, wherein the hydrophobic material is an alkylsilane, alkyldisilazane, fluoropolymer, or a combination thereof.

4. The coating system of claim 1, wherein the nanomaterial is a nanoparticle, a nanorod, a nanofiber, a nanosheet, or a combination thereof.

5. The coating system of claim 1, wherein the conductive layer comprises a thermal stabilizer.

6. The coating system of claim 5, wherein the thermal stabilizer comprises zinc oxide.

7. The coating system of claim 5, wherein the conductive layer has a thickness of about 15 μm to about 35 μm.

8. The coating system of claim 1, further comprising an insulating layer underlying the conductive layer.

9. The coating system of claim 1, wherein the anti-icing layer comprises a polymer.

10. The coating system of claim 9, wherein the polymer is a sol gel, polysiloxane, polyester, fluoropolymer, a polysiloxane, or a combination thereof.

11. The coating system of claim 1, wherein the anti-icing layer further comprises low surface energy additives or hygroscopic additives.

12. The coating system of claim 1, wherein the anti-icing layer comprises a polytetrafluoroethylene (PTFE) and/or a glycol based component.

13. A method of coating a substrate, comprising:
depositing a conductive layer comprising an electrically conductive material over the substrate, the conductive layer having a sheet resistivity of about 10Ω/□ to about 1000Ω/□; and
depositing an anti-icing layer comprising a nanomaterial having a contact angle greater than 90 degrees according to ASTM D7334 over the conductive layer to form a coating system, wherein the anti-icing layer is substantially free of the electrically conductive material.

14. The method of claim 13, further comprising combining a thermal stabilizer with the conductive material, wherein the conductive layer comprises the thermal stabilizer in an amount of less than 5 wt % based on weight of the conductive layer.

15. The method of claim 13, wherein coating the substrate comprises coating one or more electrodes disposed over the substrate.

16. The method of claim 13, wherein the anti-icing layer is deposited by flow-coating, drop-casting, dipping, spraying, brush coating, spin coating, roll coating, in-mold coating, co-curing, or electrocoating.

17. The method of claim 3, further comprising curing the anti-icing layer at about 10° C. to about 40° C., about 500 torr to about 760 torr, and a relative humidity of less than about 50% relative humidity.

18. The method of claim 13, further comprising dissolving the conductive material in a solvent selected from a group consisting of xylene, benzene, toluene, dimethyl sulfoxide, water, and mixtures thereof.

19. The method of claim 18, wherein the conductive layer is deposited by flow-coating, drop-casting, dipping, spraying, brush coating, spin coating, roll coating, in-mold coating, co-curing, or electrocoating.

20. The method of claim 13, wherein the anti-icing layer further comprises low surface energy additives or hygroscopic additives.

* * * * *

UNITED STATES PATENT AND TRADEMARK OFFICE
CERTIFICATE OF CORRECTION

| | | |
|---|---|---|
| PATENT NO. | : 11,976,217 B2 | Page 1 of 1 |
| APPLICATION NO. | : 18/345193 | |
| DATED | : May 7, 2024 | |
| INVENTOR(S) | : Patrick J. Kinlen et al. | |

It is certified that error appears in the above-identified patent and that said Letters Patent is hereby corrected as shown below:

In the Claims

In Column 20, Line 8, in Claim 17, delete "claim 3," and insert -- claim 13, --.

Signed and Sealed this
Twenty-fourth Day of September, 2024

Katherine Kelly Vidal
*Director of the United States Patent and Trademark Office*